Dec. 24, 1929.    R. H. GARDNER ET AL    1,740,584
REFINING OF HYDROCARBON OILS
Filed July 13, 1926
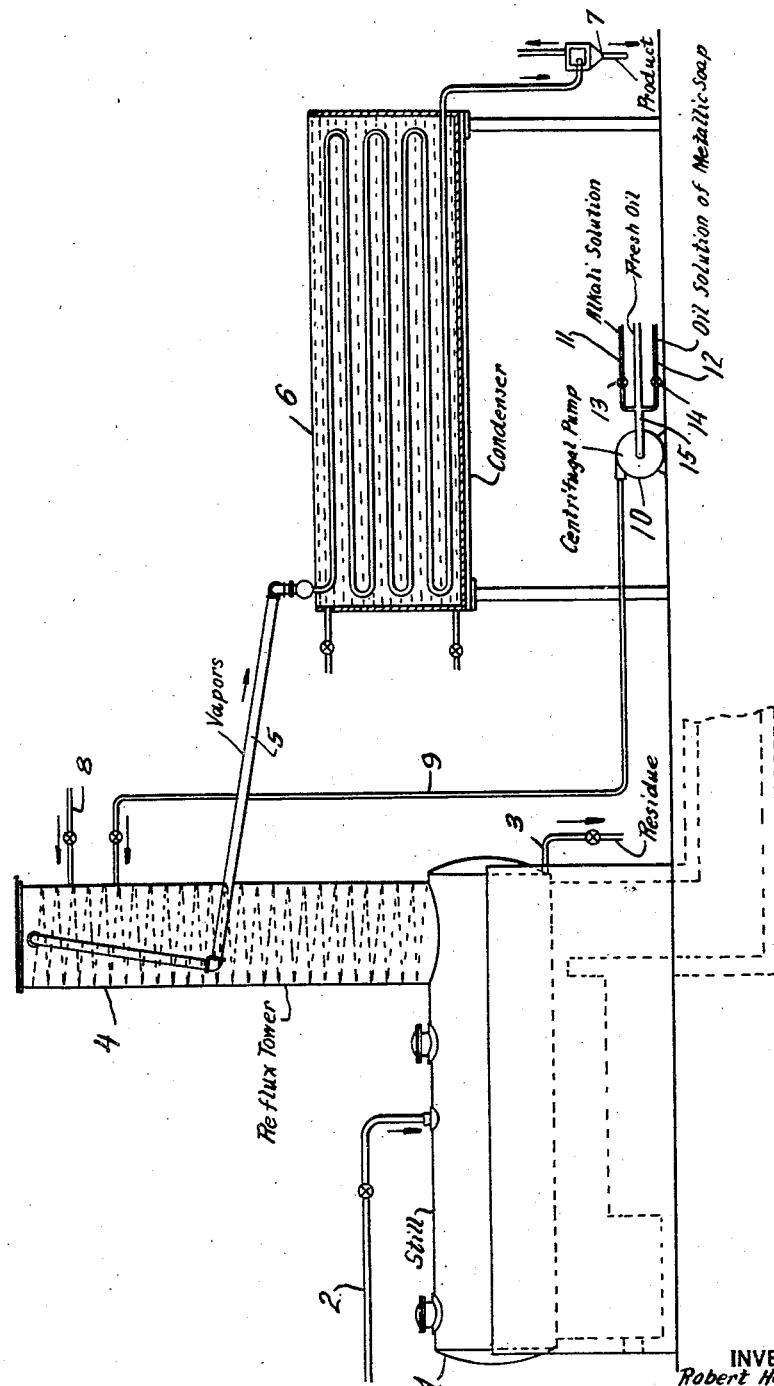
INVENTORS
Robert Henry Gardner
Howard George Hodge
BY
Rector Hibben Davis & Macauley
ATTORNEYS Patented Dec. 24, 1929

1,740,584

UNITED STATES PATENT OFFICE

ROBERT HENRY GARDNER AND HOWARD GEORGE HODGE, OF COFFEYVILLE, KANSAS, ASSIGNORS TO SINCLAIR REFINING COMPANY, OF NEW YORK, N. Y., A CORPORATION OF MAINE

REFINING OF HYDROCARBON OILS

Application filed July 13, 1926. Serial No. 122,176.

This invention relates particularly to the treatment of light petroleum distillates such as benzine, gasoline and cracked distillates. One of the general methods that has been employed for some time in refining such oils consists in subjecting them to treatment with sulphuric acid, then to an alkali treatment and finally to a so-called "doctor" treatment. Following treatment with sulphuric acid, the oils are frequently rerun, that is redistilled, and the alkali treatment may be combined with this redistillation, for example by carrying the distillation out over an alkali or an alkaline substance. The doctor treatment is usually made the final step in the sequence of operations to insure a "sweet" product.

One of the purposes of the doctor treatment as it has been employed is the elimination of objectionable sulphur compounds, including organic sulphides such as the mercaptans, and, in the case of oils that have been subjected to previous treatment with sulphuric acid, frequently sulphur-containing compounds introduced as a result of the acid treatment or through decomposition of constituents introduced by acid treatment, such as the alkyl sulphates. Such sulphur compounds are objectionable because they tend to render the oil unstable on exposure to light, and to impart to it bad color and odor and corrosive properties.

In the doctor treatment, as usually carried out, the oil is agitated or otherwise brought into intimate contact with the doctor solution and a so-called "break" is then effected by the addition of elementary sulphur. Due to difficulties of control, there usually remains in the oil either soluble sulphur compounds produced by reaction with the doctor solution or more frequently elementary sulphur because of the necessity of employing an excess of sulphur to bring about the break. When the break occurs, the reaction products of the doctor treatment form flocky masses which carry down a large part of the objectionable constituents.

This invention provides an improved method of treatment of such oils which minimizes difficulties such as those encountered in application of the so-called doctor treatment while at the same time effecting the purposes of such treatment, in many cases with an actual improvement in the results secured. The invention has several important advantages which will appear as the description proceeds. Among them may be mentioned ease of control and the elimination of any necessity for meticulous regulation, simplicity of operation and elimination of handling losses, economy as to refining materials, and the possibility of an improved product.

According to the present invention, the oil is subjected to treatment with an oil-soluble metallic compound reacting with sulphur to "fix" the sulphur present while the oil is undergoing distillation. The invention is carried out with particular adantage in connection with the rerunning or the redistillation of light petroleum distillates, particularly those which have previously been subjected to refining treatment with sulphuric acid. The oil is heated in a still and vapors are driven off into a reflux tower into which fresh oil is introduced in direct contact with these vapors and from which reflux condensate and admixed unvaporized fresh oil are conveyed to the still. The metallic sulphur-fixing compound is supplied in solution in the fresh oil, or part of the fresh oil, introduced into this reflux tower during the distillation. The treated product is taken off as an overhead distillate from the tower. It is also advantageous to introduce into the reflux tower together with the fresh oil a small amount of an alkali, for example, in the form of an aqueous solution emulsified with the fresh oil, or part of it, supplied to the tower. Oil-soluble compounds of the metals of the sulphide group, such as soaps, are particularly useful in carrying out the invention, and of these the copper soaps, particularly copper resinate, are of special value.

The invention will be particularly described in connection with the treatment of naphtha character fractions subjected to refining treatment with sulphuric acid. The process of the invention can be carried out in stills provided with reflux towers both of ordinary construction. The naphtha fraction may consist of a straight run naphtha fraction from crude oil or a naphtha fraction from a cracking process or varying mixtures of such fractions. After treatment with sulphuric acid in any suitable manner, the acid sludge is removed, for example, by gravity separation, and impure acid is separated, for example by washing with water. The acid treated naphtha may then be treated with a slight excess of an aqueous solution of an alkali or an alkaline earth hydroxide to neutralize any remaining acid. Without further washing or other treatment this naphtha is then ready to be subjected to the process of the invention.

A suitable oil-soluble metallic compound for use in carrying out the invention can be prepared by fusing together black copper oxide and hard rosin. Copper soap so produced is sufficiently soluble in oil such as the naphtha fractions just discussed. For example, as much as 50 pounds or more per barrel (42 gallons) can be dissolved in such naphtha fractions. Another way of preparing the copper soap is to make a substantially neutral soap by saponifying rosin with an appropriate amount of caustic soda and then converting the sodium soap to copper soap by the addition of copper sulphate. Soap so prepared is ready for use after washing and drying.

One convenient method of handling the oil-soluble metallic compounds for carrying out the invention is to dissolve them in oil to form more or less concentrated solutions. Such solutions can be prepared in large quantities as they deteriorate very little with age. When freshly made, there is frequently some cloudiness but suspended impurities settle in a short time leaving, in the case of the copper soap above described, clear brown solutions. Any material settling from such oil solutions during storage can be fused with additional quantities of hard rosin for the production of additional copper resinate.

The invention is of special value and application in connection with continuous methods of distillation, in which fresh oil is supplied and a residue or an undistilled "bottoms" withdrawn during the operation. The acid treated naphtha is introduced continuously near the top of a fractionating or reflux tower on the still or stills in which the operation is carried out, and a centrifugal pump is particularly advantageous for this purpose as it insures the distribution of the treating agents employed in the fresh oil supplied to the upper end of the tower. The oil-soluble metallic compound for fixing sulphur may, for example, be introduced as a more or less concentrated oil-solution into the fresh oil entering the suction port of such a pump. Where an alkali is also supplied with the fresh oil, it may be introduced in a similar manner. Within the pump, treating agents so supplied are distributed throughout the oil to be subjected to treatment. As an example of the amounts of treating agents employed in connection with the treatment of acid-treated naphthas, 1/30 pound of copper resinate and 0.015 gallons of a 25° Bé. caustic soda solution per barrel of naphtha may be mentioned, but it will be understood that these amounts may vary with naphthas of different quality.

When the fresh oil carrying these treating agents is introduced into the tower, it comes in contact with the hot vapors rising from the still with the result that lighter components of the fresh oil are vaporized and heavier components of the vapors are condensed. As the oil flows downwardly through the tower, therefore, it is gradually and progressively freed of lighter components and is subjected to progressively increasing temperature. At a point where temperatures are reached such that objectionable sulphur compounds would be vaporized or decomposed to form vaporous products in ordinary processes of distillation, the sulphur-fixing compounds employed in carrying out the invention combine with such components to prevent them from escaping with the vapors forming the distillate product. The reaction products, of the treatment as well as of such decomposition reactions, are thus carried into the residue preventing contamination of the distillate.

Unless used in excessive amount, the treating agents described can be maintained in suspension to an extent sufficient to permit withdrawal, at least in large part, in residual oil run off from the still over long periods of operation. Various reaction products as well as unconsumed refining agents can be settled from such residual oils when cooled and allowed to stand at rest.

One form of apparatus adapted for carrying out the process of the invention is diagrammatically illustrated in the accompanying drawing. The still 1 is of conventional construction. A charging line 2 is provided for initially charging the still and a draw-off line 3 for the removal of residual oil. Arranged above the still is a reflux or fractionating tower 4 provided with a continuous helical baffle to permit contact and heat exchange between liquid and vapor components in the tower without spraying liquids through vapors or bubbling vapors through liquids. This type of tower is particularly useful in carrying out the invention but other types of towers may also be used. Vapors escape from the top of the tower through vapor line 5 to the condenser 6 where they are condensed to form the distillate product run off through the "look-box" connection 7. To assist in control of the tower, a light fraction, such for example as a part of the distillate product or a fraction of corresponding character, may be introduced through connection 8. Fresh oil is introduced near the upper end of the tower through connection 9 by means of centrifugal pump 10. Connections 11 and 12 including control valves 13 and 14 are provided opening on opposite sides into the intake connection 15 of the pump for supplying the treating agents. An aqueous alkali solution, for example, may be supplied through connection 11 and an oil solution of a metallic soap through connection 12.

In the pump, the treating agents are dissolved or emulsified in the fresh oil and thus forced together with the fresh oil into the upper end of the tower. In the tower, the treating agents are brought into intimate and effective contact with the vapors and liquids undergoing distillation. In particular, it will be noted that in carrying out this invention products of decomposition taking place in the tower are effectively subjected to treatment with the refining agents. The various reaction products, and any excess of the refining agent, are carried downwardly into the still with the unvaporized or condensed oil and are removed from the still, in continuous operation, in suspension or solution in residual oil withdrawn from the still.

By means of this invention, finished gasolines can be obtained directly as the distillate product without further treatment from naphtha fractions, from crude oil or cracked oils or mixtures of the two.

Compounds of metals which may be designated as metals of the sulphide groups, including lead, bismuth, mercury, cadmium, arsenic, antimony, tin, nickel, cobalt, manganese and zinc with organic acids such as oleic acid stearic acid and various naphthenic and rosin acids are also useful in carrying out the invention.

It will be apparent that the improved process of the invention has several advantages. It is of special value and application in connection with continuous methods of distillation and with methods of distillation in which fresh oil is supplied through a reflux or fractionating tower. The treatment is carried out under conditions which are particularly advantageous, especially as to the time and temperature factors involved. The operation is capable of close control although usually meticulous control is not essential to the production of satisfactory products. Subsequent operations usually considered necessary in distillation processes are made unnecessary. Due to the close control possible and the highly effective use made of the refining agents, substantial economies can be effected as to refining agents. Evaporation losses incurred in the subsequent treatment of oils containing large amounts of light constitutents are eliminated.

Handling losses are also reduced or eliminated for similar reasons. Likewise, the products produced, particularly those of gasoline character, are of high quality particularly as to freedom from sulphur and corrosive qualities, and as to color and stability. The invention also makes it unnecessary to provide equipment for treatment of the oil subsequent to distillation.

We claim:

1. An improved method of treating hydrocarbon oils which comprises heating the oil in a still and driving off vapors into a reflux tower, introducing fresh oil to be treated containing a dissolved oil soluble compound of a metal of the sulphide group into the reflux tower in countercurrent contact with the vapors therein during the operation, conveying reflux condensate and admixed unvaporized fresh oil from the reflux tower to the still and taking off and condensing vapors from the reflux tower.

2. An improved method of treating hydrocarbon oils which comprises heating the oil in a still and driving off vapors into a reflux tower, introducing fresh oil to be treated containing a dissolved oil soluble soap of a metal of the sulphide group into the reflux tower in countercurrent contact with the vapors therein during the operation, conveying reflux condensate and admixed unvaporized fresh oil from the reflux tower to the still and taking off and condensing vapors from the reflux tower.

3. An improved method of treating hydrocarbon oils which comprises heating the oil in a still and driving off vapors into a reflux tower, introducing fresh oil to be treated containing a copper soap into the reflux tower in countercurrent contact with the vapors therein during the operation, conveying reflux condensate and admixed unvaporized fresh oil from the reflux tower to the still, and taking off and condensing vapors from the reflux tower.

4. An improved method of treating hydrocarbon oils which comprises heating the oil in a still and driving off vapors into a reflux tower, introducing fresh oil to be treated containing copper resinate into the reflux tower in countercurrent contact with the vapors therein during the operation, conveying reflux condensate and admixed unvaporized fresh oil from the reflux tower to the still and taking off and condensing vapors from the reflux tower.

ROBERT HENRY GARDNER.
HOWARD GEORGE HODGE.